United States Patent
Ketchie et al.

(10) Patent No.: US 12,435,024 B2
(45) Date of Patent: Oct. 7, 2025

(54) PROCESS FOR TREATING POLYESTER METHANOLYSIS DEPOLYMERIZATION PRODUCT STREAMS

(71) Applicant: Eastman Chemical Company, Kingsport, TN (US)

(72) Inventors: William Christopher Ketchie, Kingsport, TN (US); Noah Glenn McMillan, Kingsport, TN (US); Michael Paul Ekart, Kingsport, TN (US); Travis Wynn Keever, Jonesborough, TN (US)

(73) Assignee: Eastman Chemical Company, Kingsport, TN (US)

( * ) Notice: Subject to any disclaimer, the term of this patent is extended or adjusted under 35 U.S.C. 154(b) by 598 days.

(21) Appl. No.: 17/757,386

(22) PCT Filed: Dec. 16, 2020

(86) PCT No.: PCT/US2020/065254
§ 371 (c)(1),
(2) Date: Jun. 15, 2022

(87) PCT Pub. No.: WO2021/126936
PCT Pub. Date: Jun. 24, 2021

(65) Prior Publication Data
US 2023/0022664 A1    Jan. 26, 2023

Related U.S. Application Data

(60) Provisional application No. 62/950,605, filed on Dec. 19, 2019.

(51) Int. Cl.
*C07C 67/60* (2006.01)
*C07C 29/90* (2006.01)
*C08J 11/24* (2006.01)

(52) U.S. Cl.
CPC ........... *C07C 67/60* (2013.01); *C07C 29/90* (2013.01); *C08J 11/24* (2013.01)

(58) Field of Classification Search
CPC ........... C07C 29/90; C07C 67/60; C08J 11/24
See application file for complete search history.

(56) References Cited

U.S. PATENT DOCUMENTS

| 3,037,050 | A | 5/1962 | Erlenbach et al. |
| 3,321,510 | A | 5/1967 | Lotz et al. |
| 3,776,945 | A | 12/1973 | Ligorati et al. |
| 5,051,528 | A | 9/1991 | Naujokas et al. |
| 5,298,530 | A | 3/1994 | Gamble et al. |
| 5,414,022 | A | 5/1995 | Toot, Jr. et al. |
| 5,432,203 | A | 7/1995 | DeBruin et al. |
| 5,576,456 | A | 11/1996 | Gamble et al. |
| 5,710,315 | A * | 1/1998 | Gallagher ............. C07C 253/20 560/96 |
| 6,262,294 | B1 | 7/2001 | Sako et al. |
| 8,877,984 | B2 | 11/2014 | Barton et al. |
| 2009/0275698 | A1 | 11/2009 | Ravi et al. |
| 2013/0041053 | A1* | 2/2013 | Pecorini .................... C08J 11/04 521/48 |

FOREIGN PATENT DOCUMENTS

| JP | 2000 297053 A | 10/2000 |
| JP | 2003 147121 A | 5/2003 |
| JP | 4274620 B2 | 6/2009 |

OTHER PUBLICATIONS

Notification of Transmittal of the International Search Report and the Written Opinion of the International Searching Authority, or the Declarations date of mailing Apr. 16, 2021 received in International Application No. PCT/US2020/065254.

* cited by examiner

*Primary Examiner* — Yate' K Cutliff
(74) *Attorney, Agent, or Firm* — Tammye L. Taylor Polk

(57) ABSTRACT

Disclosed is a method for treating the product stream from a polyester methanolysis depolymerization process wherein the product stream includes dimethyl terephthalate and one or more side species selected from the group consisting of dimethyl phthalate, dimethyl isophthalate, bisphenol-A, an adipic acid diester and colorants. The method includes a) hydrogenating said dimethyl terephthalate to form one or more of dimethyl 1,4-cyclohexanedicarboxylate and 1,4-cyclohexanedimethanol; and (b) hydrogenating one or more of said one or more side species of said product stream. A method for depolymerization of polyester is also described.

19 Claims, No Drawings

PROCESS FOR TREATING POLYESTER METHANOLYSIS DEPOLYMERIZATION PRODUCT STREAMS

CROSS-REFERENCE TO RELATED APPLICATION(S)

This application is a national stage filing under 35 USC § 371 of International Application Number PCT/US2020/065254, filed on Dec. 16, 2020 which claims the benefit of the filing date to U.S. Provisional Application No. 62/950,605, filed on Dec. 19, 2019, the entire disclosures of which are incorporated by reference herein.

FIELD OF THE INVENTION

The present invention generally relates to the field of polyester recycle processes and more particularly to a polyester recycle process that includes depolymerization of polyester via methanolysis, recovery/use of the methanolysis reaction products and conversion of those products to useful chemical compounds.

BACKGROUND OF THE INVENTION

Polyesters are often viewed as the world's most purchased and diversely utilized class of polymers, with published world production volumes (including recycling) recently reported to be well in excess of 75 million tons. This level of commercial success is likely attributable in part to polyesters' attractive combination of relative cost, manufacturability and competitive performance attributes. Polyester's physical, chemical and thermal properties make them useful and desirable for a wide variety of end-use applications. Polyethylene terephthalate (PET) is probably one of the most popular types of polyester for many end-uses. With the continuing commercial success of polyesters generally and PET specifically has come efforts to recover materials from post-consumer, post-industrial, scrap and other sources and re-use those materials as an alternative to basic disposal methods such as landfills.

In some known recycle methods, recycled PET is blended with virgin materials. This approach has been used, for example, to prepare blends of virgin poly(butylene terephthalate) ("PBT") with recycled PET to yield a PBT-based product with recycle content (see, for example, U.S. Patent Application Publication No. 2009/0275698). Such blends, however, can be generally immiscible and produce a material that is relatively opaque. Blending, therefore, is not a uniformly satisfactory method to provide commercially acceptable end products with recycle content.

In other recycle methods, polyesters are depolymerized to form the monomer units originally used in its manufacture. One commercially utilized method for polyester depolymerization is methanolysis. In methanolysis, the polyester is reacted with methanol to produce a depolymerized polyester mixture comprising polyester oligomers, dimethyl terephthalate ("DMT"), and ethylene glycol ("EG"). Other monomers such as, for example, 1,4-cyclohexanedimethanol ("CHDM") and diethylene glycol may also be present depending on the composition of the polyester in the methanolysis feed stream. Some representative methods for the methanolysis of PET are described in U.S. Pat. Nos. 3,037,050; 3,321,510; 3,776,945; 5,051,528; 5,298,530; 5,414,022; 5,432,203; 5,576,456 and 6,262,294, the contents and disclosure of which are incorporated herein by reference. A representative methanolysis process is also illustrated in U.S. Pat. No. 5,298,530, the contents and disclosure of which is incorporated herein by reference. The '530 patent describes a process for the recovery of ethylene glycol and dimethyl terephthalate from scrap polyester. The process includes the steps of dissolving scrap polyester in oligomers of ethylene glycol and terephthalic acid or dimethyl terephthalate and passing super-heated methanol through this mixture. The oligomers can comprise any low molecular weight polyester polymer of the same composition as that of the scrap material being employed as the starting component such that the scrap polymer will dissolve in the low molecular weight oligomer. The dimethyl terephthalate and the ethylene glycol are recovered from the methanol vapor stream that issues from depolymerization reactor.

In addition to the reaction products discussed above, the reaction product stream from a polyester methanolysis depolymerization process may also include a number of side species. For example, the reaction product stream may include colorants such as dyes and pigments present in the recycle feed stream or so-called color bodies produced during depolymerization which impart an undesirable shade or color to the product. Dimethyl phthalate may be generated in methanolysis when the process feed stream includes certain plasticizers used in polymer products. Dimethyl isophthalate may be generated as a reaction product from polyester depolymerization when the feed depending on the exact composition of the polyester in the recycle feed stream. Bisphenol-A may be present in a methanolysis depolymerization reaction product stream when polycarbonate materials are present in the feed stream. Diesters of adipic acid such dimethyl adipate may be present in the reaction product stream when the feed stream includes polyamide materials.

Some of the components of a methanolysis depolymerization product stream are quite valuable and useful commercially both in polyester production and other end-uses. In one example, U.S. Published Patent Application No. U.S. 2013/0041053, assigned to the assignee of the present invention, the contents and disclosure of which are incorporated herein by reference, discloses a process wherein DMT formed from a polyester depolymerization process may be hydrogenated to 1,4 CHDM using known procedures.

The presence of one or more of these side species can negatively impact the use and recovery of more useful or commercially valuable components of the reaction product stream. While some of these products may be separable from the product stream as-is, their separation and subsequent disposal can be expensive, time-consuming and environmentally problematic. Further, the commercial value or utility of at least some of the side species may be changed or improved by conversion to other more useful or valuable compounds; however, this conversion almost certainly adds additional processing steps (and therefore cost) to the process and must be managed to avoid negative impacts on desired conversion such as the hydrogenation of DMT discussed above.

A continuing and unmet need therefore exists for a method to treat the product stream of a polyester methanolysis depolymerization process to hydrogenate DMT to 1,4 CHDM while converting one or more side species of the product stream to materials that are easily separated from the stream for either environmentally friendly disposal or subsequent re-use.

SUMMARY OF THE INVENTION

In a first aspect, the present invention relates to a method for treating the product stream from a polyester methanolysis depolymerization process wherein the product stream includes dimethyl terephthalate and one or more side species selected from the group consisting of dimethyl phthalate, dimethyl isophthalate, bisphenol-A, an adipic acid diester and colorants. The method of this aspect of the present invention includes a) hydrogenating said dimethyl terephthalate to form one or more of dimethyl 1,4-cyclohexanedicarboxylate and 1,4-cyclohexanedimethanol; and (b) hydrogenating one or more of said one or more side species of said product stream.

In another aspect, the present invention relates to method for depolymerization of polyester. The method of this aspect of the present invention includes (a) depolymerizing a polyester via methanolysis to form to polyester methanolysis depolymerization product stream that includes dimethyl terephthalate and one or more side species selected from the group consisting of dimethyl phthalate, dimethyl isophthalate, bisphenol-A, an adipic acid diester and one or more colorants; a) hydrogenating the dimethyl terephthalate to form one or more of dimethyl 1,4-cyclohexanedicarboxylate and 1,4-cyclohexanedimethanol; and (b) hydrogenating one or more of said one or more side species of said product stream. In one or embodiments, the hydrogenating step (b) includes hydrogenating the side species of said product stream.

Further aspects of the invention are as disclosed and claimed herein.

DETAILED DESCRIPTION

The term "polyester" as used herein is meant to generally include without limitation homopolyesters as well as copolyesters, terpolyesters and the like and are typically prepared by reacting a difunctional carboxylic acid or its ester, often a dicarboxylic acid, or mixtures of such acids or esters, with a difunctional hydroxyl compound, often a diol or glycol, or mixtures of such diols or glycols. Alternatively, the difunctional carboxylic acid may be a hydroxy carboxylic acid and the difunctional hydroxyl compound may be an aromatic nucleus bearing 2 hydroxyl substituents such as, for example, hydroquinone. Of particular interest regarding the invention described herein are polyesters which, via depolymerization by methanolysis or glycolysis with subsequent reaction product methanolysis, generate DMT.

The present invention, in a first aspect, is directed to a method for treating the product stream from a polyester methanolysis depolymerization process wherein the product stream includes dimethyl terephthalate and one or more side species selected from the group consisting of dimethyl phthalate, dimethyl isophthalate, bisphenol-A, an adipic acid diester and colorants. The method of the present invention includes a) hydrogenating said dimethyl terephthalate to form one or more of dimethyl 1,4-cyclohexanedicarboxylate and 1,4-cyclohexanedimethanol; and (b) hydrogenating one or more of said one or more side species of said product stream. In one or embodiments, the hydrogenating step (b) of the method comprises hydrogenating the side species of said product stream. In one or more embodiments, the method of the present invention includes a step (c) of isolating said one or more of said dimethyl 1,4-cyclohexanedicarboxylate and 1,4-cyclohexanedimethanol. The isolating step (c) may include distillation.

The methods of the present invention relate to polyester depolymerization processes which generate a product stream that includes dimethyl terephthalate and one or more side species selected from the group consisting of dimethyl phthalate, dimethyl isophthalate, bisphenol-A, an adipic acid diester and one or more colorants. The methods of the present invention relate to product streams generated by depolymerization of polyethylene terephthalate. In one or more embodiments, the polyester depolymerization process is a methanolysis depolymerization process. Depolymerization of polyesters such as polyethylene terephthalate via methanolysis is well known in the art and described for example in U.S. Published Patent Application No. U.S. 2013/0041053, assigned to the assignee of the present invention, and U.S. Pat. No. 5,051,528, assigned to a predecessor of the assignee of the present invention, the contents and disclosure of each of which are incorporated herein by reference. It will be appreciated by a person of ordinary skill that depolymerization of polyester may also be achieved via glycolysis, such as described in the above patent and application, and that dimethyl terephthalate may be formed by methanolysis of species formed in a glycolysis depolymerization product stream. The methods of the present invention therefore are also useful in treating polyester depolymerization product streams formed by glycolysis of polyester with methanolysis of one or more species generated by the glycolysis reaction. Accordingly, the phrase "polyester methanolysis depolymerization process" as used herein is intended to include any polyester depolymerization method which generates dimethyl terephthalate, including without limitation methanolysis depolymerization processes and glycolysis depolymerization processes that include a methanolysis step.

In hydrogenating step (a) of the method of the present invention, dimethyl terephthalate is hydrogenated to form one or more of dimethyl 1,4-cyclohexanedicarboxylate and 1,4-cyclohexanedimethanol. In one or more embodiments, hydrogenating step (a) of the present invention includes a first hydrogenating step (a1) of hydrogenating dimethyl terephthalate to dimethyl 1,4-cyclohexanecarboxylate (DMCD) and a second hydrogenating step (a2) of hydrogenating DMCD to 1,4-cyclohexanedimethanol (CHDM). The presence or absence of dimethyl 1,4-cyclohexanedicarboxylate and 1,4-cyclohexanedimethanol, as well as their relative amounts if both are present, will depend on a number of factors, including for example hydrogenating step (a) variables such as presence, choice and amount of catalyst, temperature, pressure and residence time.

In one or more embodiments, the hydrogenating step (a1) is performed at a temperature of from 150° C. to 300° C. and a pressure of from 700 psig to 6,000 psig. In one or more embodiments, the hydrogenating step (a2) is performed at a temperature of from 150° C. to 300° C. and a pressure of from 150 psig-6000 psig.

In hydrogenating step (b), one or more of said one or more side species of the product stream is hydrogenated. In one or more embodiments, the hydrogenating step (b) is performed at a temperature of from 150° C. to 300° C. and a pressure of from 150 psig to 6000 psig. In one or more embodiments, the hydrogenating step (b) is performed at a temperature of from 150° C. to 300° C. and a pressure of from 700 psig to 6000 psig. In one or more embodiments, the hydrogenating step (b) is performed at a temperature of from 150° C. to 300° C. and a pressure of from 150 psig to 6000 psig. One of ordinary skill will appreciate that the conditions for the hydrogenating step (b) and the compound or compounds formed by the hydrogenating step (b) is dependent in large part on the presence or absence of each individual side species.

In one or more embodiments, the one or more side species comprises dimethyl phthalate and said hydrogenating step (b) comprises hydrogenating the dimethyl phthalate to form one or more of one or more of dimethyl 1,2-cyclohexanedicarboxylate and 1,2-cyclohexanedimethanol.

The presence of dimethyl phthalate as a side species in the methanolysis depolymerization product stream may be the result of, for example, presence of phthalate-plasticized PVC in the depolymerization feed stream.

In one or more embodiments, the at least one side species includes dimethyl isophthalate and the hydrogenating step (b) comprises hydrogenating the dimethyl isophthalate to form one or more of dimethyl 1,3-cyclohexanedicarboxylate and 1,3-cyclohexanedimethanol. The presence of dimethyl isophthalate as a side species in the methanolysis depolymerization product stream may be the result of, for example, the presence of isophthalic acid that may be intentionally included in PET formulations. The presence or absence of dimethyl 1,3-cyclohexanedicarboxylate and 1,3-cyclohexanedimethanol, we well as their relative amounts when both are present, will depend on a number of factors, including for example hydrogenating step (b) variables such as presence, choice and amount of catalyst, temperature, pressure and residence time.

In one or more embodiments, the at least one side species includes bisphenol-A and the hydrogenating step (b) includes hydrogenating the bisphenol-A to form hydrogenated bisphenol A of the formula, $C_{15}H_{28}O_2$:

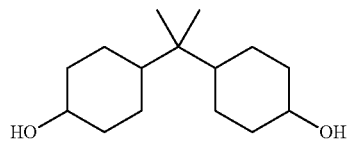 [SMILES: CC(C)(C1CCC(O)CC1)C1CCC(O)CC1]

The presence of bisphenol-A as a side species in the methanolysis depolymerization product stream may be the result of, for example, the presence of polycarbonate materials, coatings, inks or dyes in the methanolysis depolymerization feed stream.

In one or more embodiments, the one or more side species comprises an adipic acid diester and said hydrogenating step (b) comprises hydrogenating the adipic acid ester to form a diol. By way of non-limiting example, the adipic acid diester may be dimethyl adipate and the diol formed may be 1,6 hexanediol. The presence of dimethyl adipate as a side species in the methanolysis depolymerization product stream may be the result of, for example, the presence of polyamide materials in the methanolysis depolymerization feed stream.

In one or embodiments, the one or more side species includes at least one colorant and said hydrogenating step (b) includes hydrogenating the at least one colorant to a hydrogenated colorant. As used herein, the term "colorant" is intended to mean a component present in a composition, product, article or process stream which imparts a measurable difference in color to that composition, article, product or process stream when compared to that composition, article, product or process stream in the absence of that component. Non-limiting examples of colorants include pigments, dyes, additives and the like intentionally added to create color as well as impurities, species and other so-called color bodies which can be formed in the course of chemical processing such as methanolysis. Accordingly, the presence of a colorant as a side species in the methanolysis depolymerization product stream may be the result of, for example, the presence or a dye, pigment or similar material in the methanolysis depolymerization product stream or the formation of an impurity or color body during the methanolysis depolymerization process.

In one or more embodiments, it is contemplated that two or more side species selected from the group consisting of dimethyl phthalate, dimethyl isophthalate, bisphenol-A, an adipic acid diester and one or more colorants may be present in the product stream. For example, in one or more embodiments, the one or more side species of the product stream includes at least two side species, one of which is dimethyl isophthalate.

In one or more embodiments, at least one of the hydrogenating step (a) and the hydrogenating step (b) are performed in the presence of a catalyst and, in some embodiments, both the hydrogenating step (a) and the hydrogenating step (b) are performed in the presence of a catalyst. Further, for embodiments wherein the hydrogenating step (a) includes a first hydrogenating step (a1) of hydrogenating dimethyl terephthalate to dimethyl 1,4-cyclohexanecarboxylate (DMCD) and a second hydrogenating step (a2) of hydrogenating DMCD to 1,4-cyclohexanedimethanol, one or both of hydrogenating steps (a1) and (a2) may be performed in the presence of a catalyst. For each step, suitable catalysts and catalyst systems may vary and may be selected based on a number of factors, including for example reactor design, reaction conditions, presence or absence of individual side species, and active metal/support combination. Suitable hydrogenation catalysts are well in the art and include for example, copper-based catalysts, tin-based catalysts, palladium-based catalysts and ruthenium-based catalysts. Suitable hydrogenation catalysts are also described for example in U.S. Pat. No. 8,877,98462, the contents and disclosure of which are incorporated herein by reference, and are commercially available for example from BASF, Johnson Matthey and Clariant.

In one or more embodiments, the hydrogenating step (a1) and the hydrogenating step (b) are each performed in the presence of the same catalyst load. In one or more embodiments, the hydrogenating step (a2) and the hydrogenating step (b) are each performed in the presence of the same catalyst load.

In one or more embodiments, the hydrogenating step (a1) is performed in the presence of a palladium-based catalyst. In one or more embodiments, the hydrogenating step (a2) is performed in the presence of a copper-based catalyst.

With regard to hydrogenation step (b), suitable catalysts are selected in large part on the presence or absence of individual side species and include palladium-based catalysts and ruthenium-based catalysts when the at least one side species includes dimethyl phthalate; palladium-based catalysts and ruthenium-based catalysts when the at least one side species includes dimethyl isophthalate; palladium-based catalysts and ruthenium-based catalysts when the at least one side species includes bisphenol-A; copper-based catalysts and ruthenium-based catalysts when the at least one side species includes an adipic acid diester such as dimethyl ester; and copper-based catalysts, palladium-based catalysts and ruthenium-based catalysts when the at least one side species includes one or more colorants.

In one or more embodiments, the hydrogenating step (a) and the hydrogenating step (b) are performed concurrently to form a hydrogenated product stream. More particularly, in one or more embodiments, the hydrogenating step (b) is performed concurrently with at least one of hydrogenating step (a1) and hydrogenating step (a2). Further, in one or more embodiments, the hydrogenating step (b) is performed concurrently with step (a2) to form a hydrogenated product stream. In one or more embodiments, the hydrogenating step (b) includes a first hydrogenating step (b1) performed concurrently with step (a1) and a second hydrogenating step (b2) performed concurrently with step (a2). As used herein, the term "concurrently" is intended to connote that the steps are performed at substantially the same time. Non-limiting examples of embodiments wherein the steps are performed concurrently may include (i) performing the steps in a singular reactor, tank or similar device; (ii) performing the steps in the presence of the same catalyst load; and (iii) performing the steps under substantially the same temperature and pressure. In one or more embodiments, the hydrogenating step (a) and the hydrogenating step (b) are performed at a temperature of from 150° C. to 300° C. and a pressure of from 150 psig to 6000 psig.

Though the method of the present invention is discussed above in regards to concurrent performance of the hydrogenating step (a) and the hydrogenating step (b), it will be understood that, in one or more embodiments, the hydrogenating step (a) and the hydrogenating step (b) may be performed sequentially.

In one or more embodiments, the method of the present invention further includes the step (c) of isolating the one or more of dimethyl 1,4-cyclohexanedicarboxylate and 1,4-cyclohexanedimethanol. Suitable isolating steps include known separation methods including for example distillation.

The present invention, in a second aspect, is directed to method for depolymerization of polyester. The method of this aspect of the present invention includes (a) depolymerizing a polyester via methanolysis to form to polyester methanolysis depolymerization product stream that includes dimethyl terephthalate and one or more side species selected from the group consisting of dimethyl phthalate, dimethyl isophthalate, bisphenol-A, an adipic acid diester and one or more colorants; a) hydrogenating the dimethyl terephthalate to form one or more of dimethyl 1,4-cyclohexanedicarboxylate and 1,4-cyclohexanedimethanol; and (b) hydrogenating one or more of said one or more side species of said product stream. In one or embodiments, the hydrogenating step (b) includes hydrogenating the side species of said product stream. In one or more embodiments, the method of the present invention further includes a step (c) of isolating said one or more of said dimethyl 1,4-cyclohexanedicarboxylate and 1,4-cyclohexanedimethanol. The isolating step (c) may include known separation techniques such as distillation.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

That which is claimed is:

1. A method for treating the product stream from a polyester methanolysis depolymerization process, said product stream comprising dimethyl terephthalate and one or more side species selected from the group consisting of dimethyl phthalate, dimethyl isophthalate, bisphenol-A, an adipic acid diester and one or more colorants, said method comprising
    (a) hydrogenating said dimethyl terephthalate to form one or more of dimethyl 1,4-cyclohexanedicarboxylate and 1,4-cyclohexanedimethanol; and
    (b) hydrogenating one or more of said one or more side species of said product stream; wherein at least one of or both of said hydrogenating step a) and said hydrogenating step (b) are performed in the presence of a catalyst.

2. The method of claim 1 wherein said hydrogenating step (a) comprises a first hydrogenating step (a1) of hydrogenating dimethyl terephthalate to dimethyl 1,4-cyclohexanecarboxylate (DMCD) and a second hydrogenating step (a2) of hydrogenating DMCD to 1,4-cyclohexanedimethanol.

3. The method of claim 2 wherein said hydrogenating step (b) is performed concurrently with at least one of said step (a1) and said step (a2).

4. The method of claim 3 wherein said hydrogenating step (b) is performed concurrently with step (a2) to form a hydrogenated product stream.

5. The method of claim 1 wherein said one or more side species comprises dimethyl isophthalate and said hydrogenating step (b) comprises hydrogenating said dimethyl isophthalate to form one or more of dimethyl 1,3-cyclohexanedicarboxylate and 1,3-cyclohexanedimethanol.

6. The method of claim 1 wherein said one or more side species comprises dimethyl phthalate and said hydrogenating step (b) comprises hydrogenating said dimethyl phthalate to form one or more of dimethyl 1,2-cyclohexanedicarboxylate and 1,2-cyclohexanedimethanol.

7. The method of claim 1 wherein said one or more side species comprises bisphenol-A and said hydrogenating step (b) comprises hydrogenating said bisphenol-A to from hydrogenated bisphenol A of the formula:

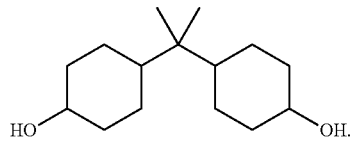

8. The method of claim 1 wherein said one or more side species comprises an adipic acid diester and said hydrogenating step (b) comprises hydrogenating said adipic acid ester to form a diol.

9. The method of claim 1 wherein said one or more side species comprises at least two side species, one of which is dimethyl isophthalate.

10. The method of claim 2 wherein said hydrogenating step (a1) and said hydrogenating step (b) are each performed in the presence of the same catalyst load.

11. The method of claim 2 wherein said hydrogenating step (a2) and said hydrogenating step (b) are each performed in the presence of the same catalyst load.

12. The method of claim 2 wherein hydrogenating step (a1) is performed in the presence of a palladium-based catalyst and hydrogenating step (a2) is performed in the presence of a copper-based catalyst.

13. The method of claim 12 wherein said hydrogenation step (a1) is performed at a temperature of from 160° C. to 240° C. and a pressure of 700 to 6000 psig and hydrogenation step (a2) is performed at a temperature of from 210° C. to 280° C. and a pressure of 150 to 6000 psig; or wherein said hydrogenation step (a1) is performed at a temperature of from 160° C. to 240° C. and a pressure of 1800 psig and hydrogenation step (a2) is performed at a temperature of from 210° C. to 280° C. and a pressure of 6000 psig.

14. The method of claim 1 wherein said hydrogenating step (b) comprises hydrogenating the side species of said product stream.

15. The method of claim 1 further comprising the step (c) of isolating said one or more of said dimethyl 1,4-cyclohexanedicarboxylate and 1,4-cyclohexanedimethanol.

16. The method of claim 2 wherein the hydrogenating step (b) includes a first hydrogenating step (b1) performed concurrently with step (a1) and a second hydrogenating step (b2) performed concurrently with step (a2).

17. A method for treating the product stream from a polyester methanolysis depolymerization process, said product stream comprising dimethyl terephthalate and one or more side species selected from the group consisting of dimethyl phthalate, dimethyl isophthalate, bisphenol-A, an adipic acid diester and one or more colorants, said method comprising
(a) hydrogenating said dimethyl terephthalate to form one or more of dimethyl 1,4-cyclohexanedicarboxylate and 1,4-cyclohexanedimethanol; and
(b) hydrogenating one or more of said one or more side species of said product stream; wherein (i) said one or more side species comprises dimethyl phthalate and said hydrogenating step (b) comprises hydrogenating said dimethyl phthalate to form one or more of dimethyl 1,2-cyclohexanedicarboxylate and 1,2-cyclohexanedimethanol; (ii) said one or more side species comprises bisphenol-A and said hydrogenating step (b) comprises hydrogenating said bisphenol-A to from hydrogenated bisphenol A of the formula:

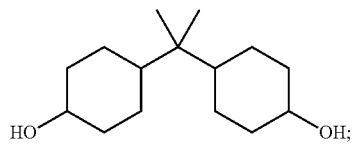 [SMILES: CC(C)(C1CCC(O)CC1)C1CCC(O)CC1]

or (iii) said one or more side species comprises an adipic acid diester and said hydrogenating step (b) comprises hydrogenating said adipic acid ester to form a diol.

18. The method of claim 8 or claim 17 wherein said adipic acid diester is dimethyl adipate and said diol is 1,6 hexanediol.

19. The method of claim 18 wherein said hydrogenating step (b) is performed concurrently with step (a2).

* * * * *